United States Patent
Ogawa

(10) Patent No.: US 6,571,002 B1
(45) Date of Patent: May 27, 2003

(54) EYE OPEN/CLOSE DETECTION THROUGH CORRELATION

(75) Inventor: Kenji Ogawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/437,110

(22) Filed: Nov. 9, 1999

(30) Foreign Application Priority Data

May 13, 1999 (JP) ............................................. 11-133049

(51) Int. Cl.7 ............................ G06K 9/00; G06F 17/15
(52) U.S. Cl. ....................... 382/117; 382/278; 382/296; 340/575
(58) Field of Search ................................. 382/117, 118, 382/289, 293, 296, 298, 209, 278; 340/575, 576; 351/206, 209, 210

(56) References Cited

U.S. PATENT DOCUMENTS

| | | | | |
|---|---|---|---|---|
| 4,759,076 A | * | 7/1988 | Tanaka et al. ............... | 345/657 |
| 5,795,306 A | * | 8/1998 | Shimotani et al. ........... | 600/558 |
| 5,867,587 A | * | 2/1999 | Aboutalib et al. ........... | 382/117 |
| 5,878,156 A | * | 3/1999 | Okumura ..................... | 340/575 |
| 5,905,563 A | * | 5/1999 | Yamamoto ................... | 351/210 |
| 6,055,323 A | * | 4/2000 | Okumura ..................... | 382/115 |
| 6,292,575 B1 | * | 9/2001 | Bortolussi et al. ........... | 382/107 |

FOREIGN PATENT DOCUMENTS

| | | | |
|---|---|---|---|
| JP | 9-44684 | 2/1997 | ............. G06T/7/60 |
| JP | 09-039603 | * 2/1997 | |

* cited by examiner

*Primary Examiner*—Bhavesh M. Mehta
*Assistant Examiner*—Christopher Sukhaphadhana
(74) *Attorney, Agent, or Firm*—Sughrue Mion, PLLC

(57) ABSTRACT

A region of the eyes in an image of the face photographed by a camera 1 and input to an image input means 2 is specified by an eye-region determining means 8. The image of the eyes in the eye region is binarized by an eye-image binarizing means 9. The coordinates of the binarized image are rotated by a coordinate rotating means 10 to obtain an adequate correlation coefficient. The image of the eyes, the coordinates of which have been rotated, is used in a calculation which is performed by a correlation calculating means 11. In accordance with an obtained correlation coefficient, an opening/closing determining means 12 determines whether the eyes are opened or closed.

10 Claims, 17 Drawing Sheets

ROTATE BY 45°

INCLINATION: 1
$R^2 = 0.7$

INCLINATION: SMALLER THAN 1
$R^2 = 0.6$

INCORRECT IMAGE OF EYE FROM WHICH PORTION IS CHIPPED

RESULT OF CORRECTION SUCH THAT INCLINATION IS 1

EYE OPEN/CLOSE DETECTION THROUGH CORRELATION

BACKGROUND OF THE INVENTION

The present invention relates to a face-image processing apparatus for use in an apparatus which extracts an image of the eye so as to detect a state of opening/closing of the eyes of a person which must be photographed in accordance with the state of the image of the eye.

Hitherto, a state of a driver who drives a vehicle including inattentive driving and driving the vehicle asleep has been detected by a face-image processing apparatus. The apparatus is structured to photograph the face of the driver with a camera disposed in a cabin of the vehicle. Then, the obtained image of the face is processed to extract the eyes which are characteristic points of the face so as to detect opening/closing of the eyes. As a conventional apparatus of the foregoing type, an apparatus has been disclosed in the Unexamined Japanese Patent Application Publication No. Hei 9-44684 having a structure that a density gradient image is converted into a binarized image. Then, the eyes are extracted from black regions in the profile of the extracted face. Then, inclinations of the upper portions of the corners of the eyes in the extracted image of the eyes are detected by obtaining primary correlation. In accordance with change in the inclinations, opening/closing of the eyes is determined.

FIG. 19 is a schematic view showing detection of the state of a driver which is performed by the structure disclosed in the Unexamined Japanese Patent Application Publication No. Hei 9-44684.

Referring to FIG. 19, reference numeral 1 represents a camera for photographing the driver; 2 represents an image input means to which a density gradient image is input and which A/D-converts the image into a digital gradation image; 3 represents a binarizing means for binarizing the digital gradation image obtained by conversion performed by the image input means 2; 4 represents an eye-extraction means for extracting a region in which the eyes exists from the binarized image; 5 represents an evaluation-function calculating means for calculating a shape function from the region and further calculating an evaluation function such that attention is paid to circular-arc shapes; and 6 represents opening/closing determining means for determining opening/closing of the eyes in accordance with the value of the evaluation function.

FIG. 20 is a diagram showing the operation of the structure shown in FIG. 19 in which opening/closing of the eyes is determined by using the binarized image of the region, in which the eyes exist, and which has been extracted from the image.

The conventional detection of the state of the driver structured as described above is performed such that a density gradient image supplied from the camera 1, which has photographed the face of the driver, is, as an image signal, input to the image input means 2 so as to be A/D-converted. A digital gradation image obtained by the conversion is, by the binarizing means 3, binarized with a predetermined threshold, that is, converted into black pixels and white pixels. Then, the eye-extraction means 4 extracts a region in which the eyes exist. The eye-extraction means 4, for example, obtains the center of gravity from a mean coordinate of the black pixels in the binarized image. A rectangular region in a lateral predetermined range in the direction X in which a cluster of black pixels nearest the foregoing center of gravity is extracted as the region in which the eyes exist. Then, the evaluation-function calculating means 5 calculates the shape of the overall portion of the binarized image of the eyes in the region in which the eyes exist, that is, a shape function showing the characteristic. In accordance with the shape function, an evaluation function in which attention is paid to the circular-arc shape is calculated so that the value of the function is recorded in a memory. Then, the opening/closing determining means 6 determines a threshold from the value K of the evaluation function which is changed as time elapses so that opening/closing of the eyes is determined.

An example of the shape function will now be described with reference to FIG. 20.

FIG. 20 shows transition of time (TA at which the eyes are opened, TC at which the eyes are closed and TB between TA and TC) and binarized images in the region in which the eyes exist corresponding to the transition of time. The upper pixels in predetermined ranges in the vicinity of the corners of the eyes of the binarized image of the eyes are approximated to straight lines by using the least-square method.

Thus, the inclination is enlarged when the eyes are opened and the inclination is reduced as the eyes are closed as illustrated. That is, assuming that the coordinates of the upper pixels of the corners of the eyes in a predetermined range (n pixels) are (xi, yi), the inclinations are calculated as follows:

$$K=(n\Sigma xy-\Sigma x\Sigma y)/(n\Sigma x^2-(\Sigma x)^2)$$

Although the inclinations of the corners of the eyes are changed when the face is inclined, an average value of the inclinations of the two corners of the eyes is obtained to compensate the influence of the inclination. That is, assuming that the inclination of the corner of the left eye is KL and the inclination of the corner of the right eye is KR, opening/closing of the eyes is evaluated by the following equation:

$$K=(KL+KR)/2$$

Then, the opening/closing evaluating means 6 sets threshold KB for determining opening/closing so as to determine opening/closing in accordance with the value of K.

Finally, driving the vehicle asleep is determined in accordance with the state of opening/closing of the eyes detected by a nictation detecting means.

The foregoing conventional apparatus, however, encounters change in the image of the eyes which is binarized by the binarizing means 3 when the environment in terms of light for the person who is photographed has rapidly been changed or owning to dispersion occurring when the A/D conversion is performed. In particular, a considerable influence of the change is exerted on the lines of the eyelids, and in particular, on the corners of the eyes. Therefore, when the inclinations of the corners of the eyes are calculated by the above-mentioned least-square method, the values of the inclinations are undesirably changed owning to the foregoing factors. Therefore, there arises a problem in that an error is easily caused in detection.

If the environment in terms of light for the right eye and that for the left eye of the person who is photographed are different from each other, the states of binarization for the right eye and the left eye are unbalanced. Thus, there arises a problem in that opening/closing of the eyes cannot accurately be evaluated.

SUMMARY OF THE INVENTION

To solve the above-mentioned problems, an object of the present invention is to obtain a face-image processing apparatus which is capable of stably determining a state of opening/closing of the eyes if a state of binarization of an image of the eyes of a photographed person which is performed by an eye-image binarizing means is changed.

A face-image processing apparatus according to the present invention comprises: image input means to which an image of the face photographed by a camera is input; eye-image extracting means for extracting a binarized image of the eye from the image of the face input by the image input means; coordinate rotating means for rotating the coordinates of the image of the eye extracted by the eye-image extracting means for a predetermined angle; correlation calculating means for calculating primary correlation by using the image of the eye rotated by the coordinate rotating means; and opening/closing determining means for determining opening/closing of the eye in accordance with a correlation coefficient obtained owning to the calculation performed by the correlation calculating means.

The eye-image extracting means incorporates an eye-region determining means for specifying the eye region of the image of the face input by the image input means and a binarizing means for binarizing the image of the eye contained in the eye region.

The apparatus further comprises length-and-breadth enlarging means for enlarging the length and breadth of the image of the eye binarized by the eye-image extracting means.

The apparatus further comprises means for controlling enlargement of the length and breadth of the image of the eye which is performed by the length-and-breadth enlarging means so that the correlation coefficient satisfies a predetermined range.

The apparatus further comprise inclination correction means for correcting the inclination of the image of the eye binarized by the eye-image extracting means, wherein the coordinate rotating means rotates the image of the eye corrected by the inclination correction means.

The inclination correction means performs correction so that the correlation coefficient satisfies a predetermined range.

The apparatus further comprises inclination estimating means for estimating the inclination of the image of the face from the image of the face input by the image input means, wherein the inclination correction means uses the inclination of the image of the face estimated by the inclination estimating means to correct the image of the eye.

The apparatus further comprises inclination estimating means for estimating the inclination of the image of the face input by the image input means, wherein the inclination estimated by the inclination estimating means is used to limit the correction of the inclination of the image of the eye which is performed by the inclination correction means.

The inclination estimating means estimates the inclination by using an image of the nostrils extracted from the image of the face.

The extraction of the image of the nostrils is performed by nostril-region determining means for specifying a nostril region and nostril extracting means for extracting the image of nostrils from the nostril region specified by the nostril-region determining means.

DETAILED DESCRIPTION OF THE PREFERRED EMBODIMENTS

First Embodiment

Figure 1:
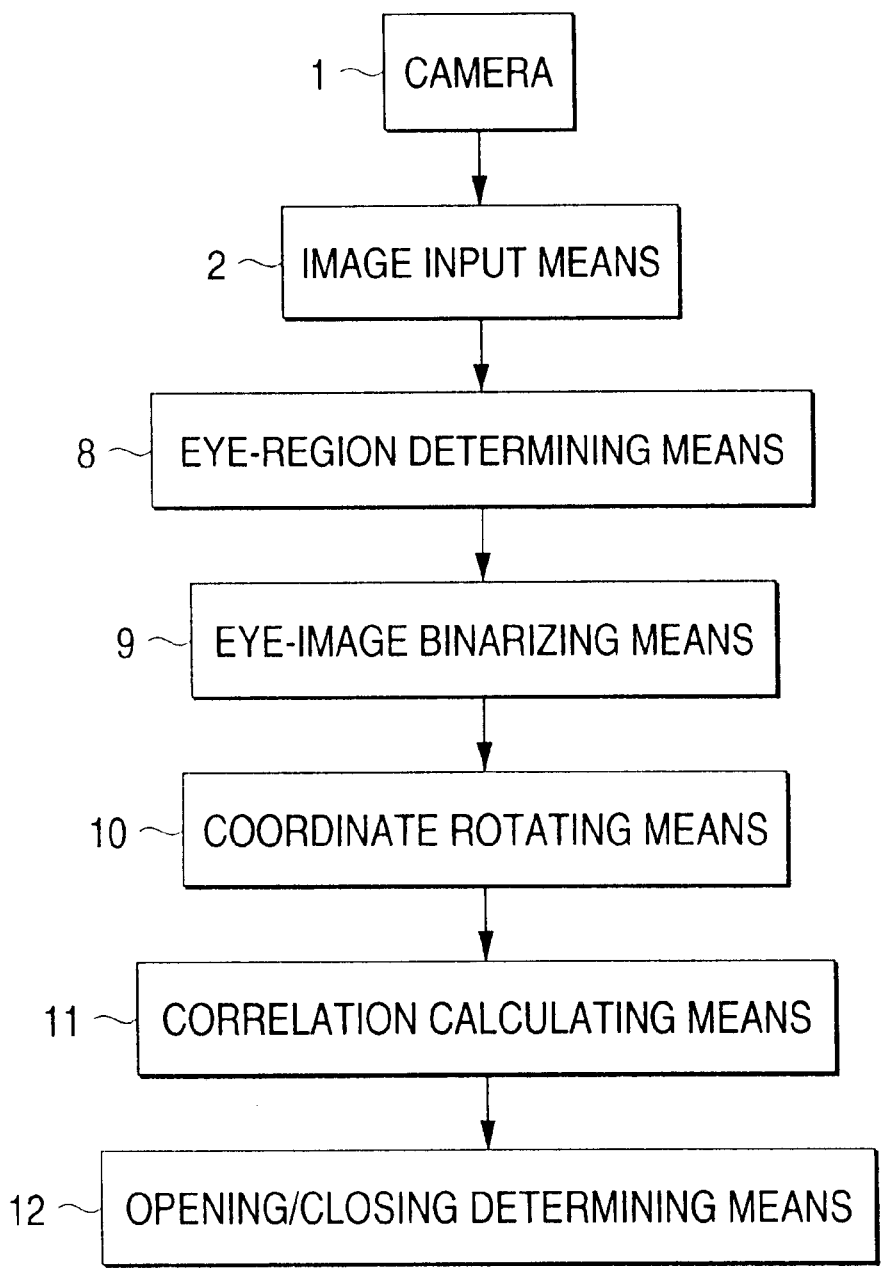
FIG. 1 is a schematic view showing the structure of a face-image processing apparatus according to a first embodiment of the present invention.

FIG. 1 is a schematic view showing the structure of a face-image processing apparatus according to a first embodiment of the present invention.

Referring to FIG. 1, reference numeral 1 represents a camera for photographing a person which must be photographed. Reference numeral 2 represents an image input means to which an image photographed by the camera is input and which A/D-converts the photographed image to obtain a digital gradation image. Reference numeral 8 represents an eye-region determining means for specifying an eye region included in the image. Reference numeral 9 represents an eye-image binarizing means for binarizing the image of the eyes included in the eye region. The eye-image binarizing means 9 and the eye-region determining means 8 constitute an eye-image extracting means. Reference, numeral 10 represents a coordinate rotating means for rotating the coordinates of the binarized image of the eyes. Reference numeral 11 represents a correlation calculating means for calculating a correlation coefficient from the image of the eyes, the coordinates of which have been rotated. Reference numeral 12 represents an opening/closing determining means for determining opening/closing of the eyes in accordance with change in the correlation coefficient as the time elapses.

Figure 3A:
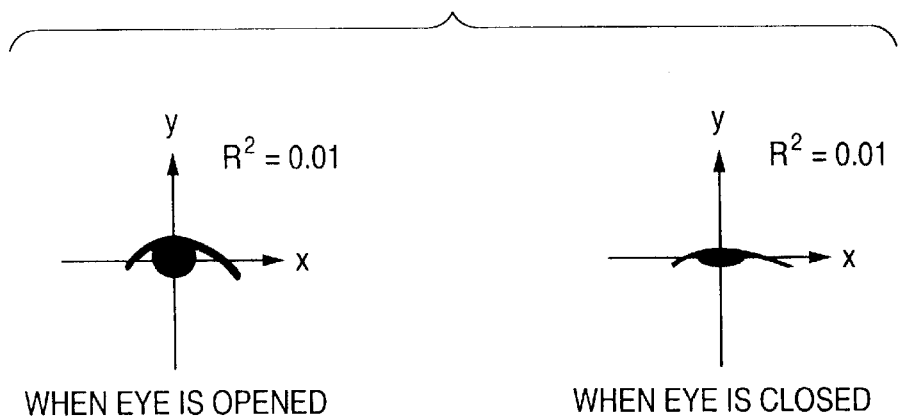
FIGS. 3A and 3B are conceptual views showing evaluation of opening/closing of the eyes which is performed by the face-image processing apparatus according to the first embodiment of the present invention by using the correlation coefficient.
Figure 3B:
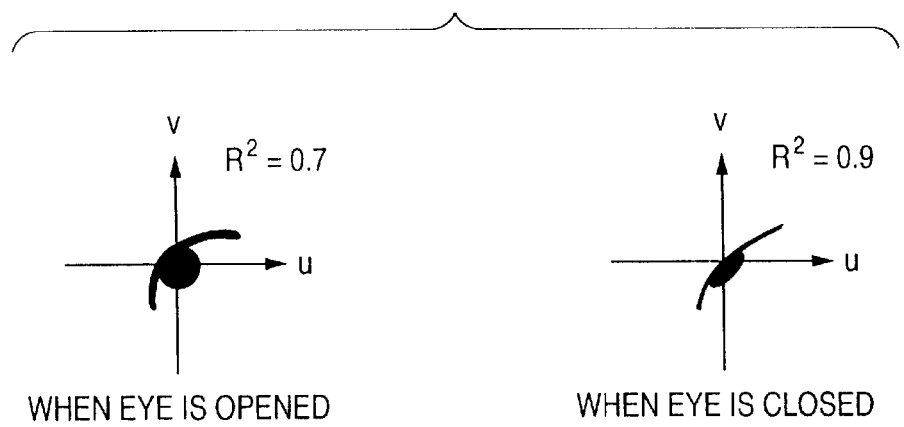

FIGS. 3A and 3B are conceptual views showing an operation of the face-image processing apparatus according to the first embodiment of the present invention for evaluating opening/closing of the eyes by using the correlation coefficient. FIG. 3A shows binarized images of the eye in an opened state and a closed state. FIG. 3B shows images of the eyes, the coordinates of which have been rotated.

Figure 4:
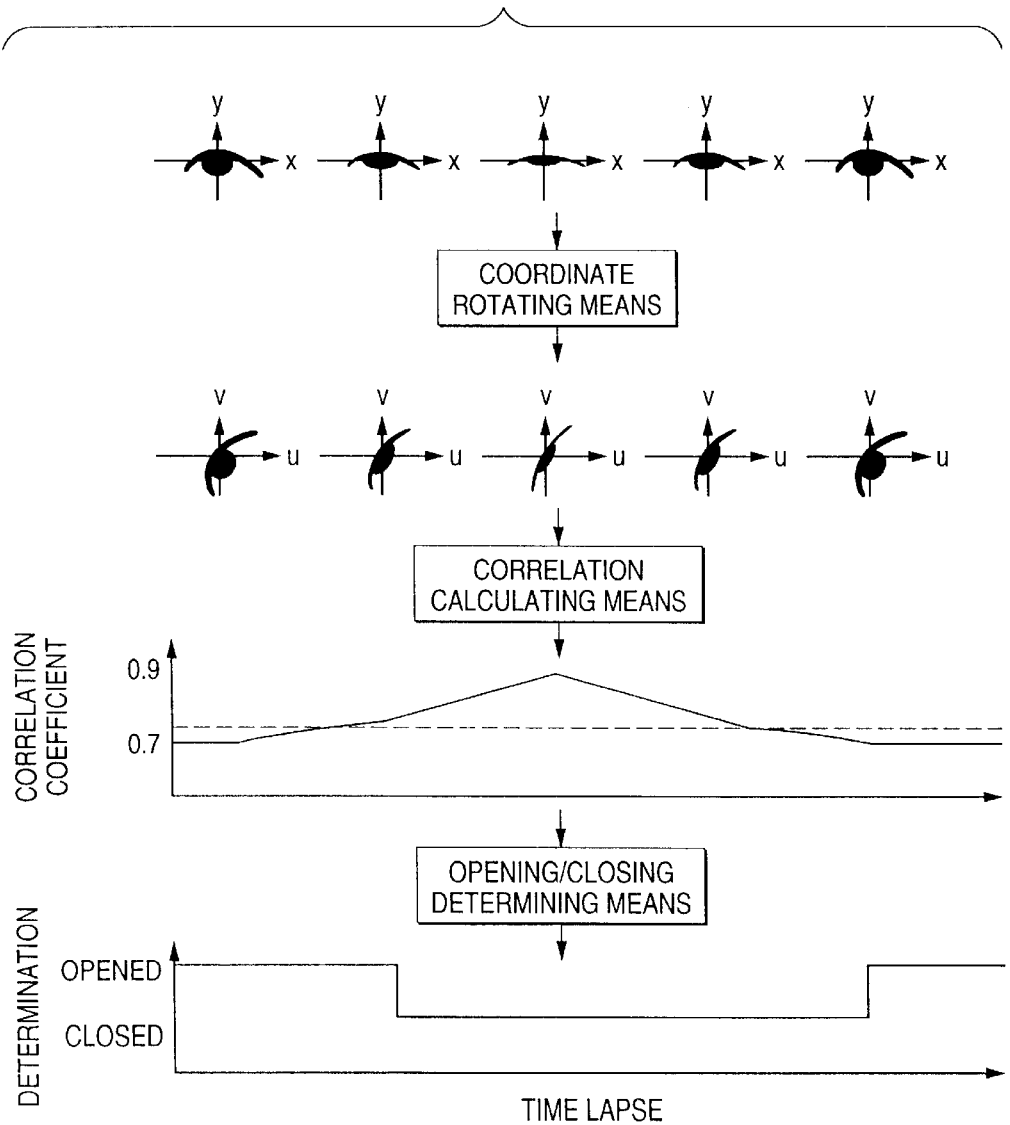
FIG. 4 is a time chart showing a method of detecting opening/closing of the eyes which is performed by the face-image processing apparatus according to the first embodiment of the present invention.

FIG. 4 is a time chart showing a method of detecting opening/closing of the eyes which is employed by the face-image processing apparatus according to the first embodiment of the present invention.

The operation will now be described.

An image of the face photographed by the camera 1 is input to the image input means 2 so as to be A/D-converted similarly to the conventional structure. Thus, the image is converted into a digital image. Then, the eye-region determining means 8 specifies the eye region included in the image. Then, the image of the eyes included in the specified eye region is processed by the eye-image binarizing means 9 so that a binarized image of the eyes is obtained. The coordinates of the binarized image of the eyes are rotated by the coordinate rotating means 10 so as to be supplied to the correlation calculating means 11. The primary correlation coefficient calculated by the correlation calculating means 11 is supplied to the opening/closing determining means 12 so that opening/closing of the eyes is determined in accordance with change in the correlation coefficient as time elapses.

The characteristics of the correlation coefficient which can be obtained by the primary correlation calculation which is performed by the correlation calculating means 11 will now be described.

Figure 2B:
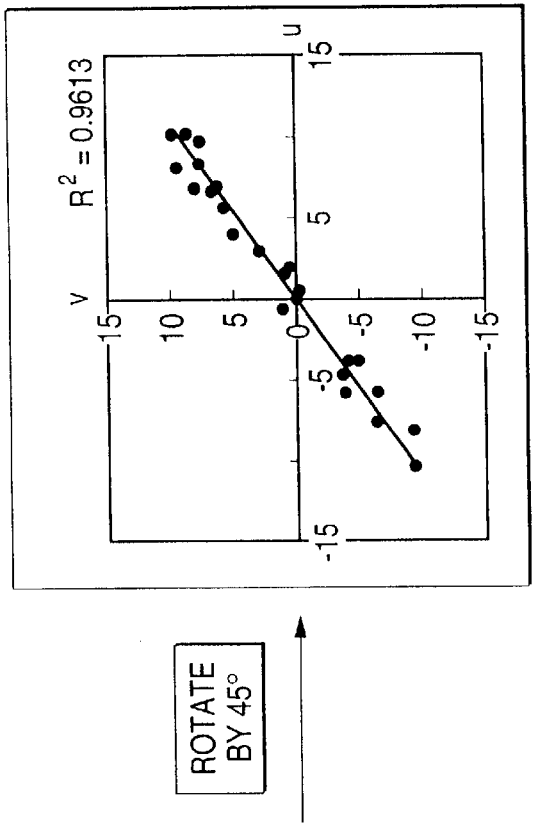
FIGS. 2A and 2B are diagrams showing the characteristics of a correlation coefficient of the face-image processing apparatus according to the first embodiment of the present invention.
Figure 2A:
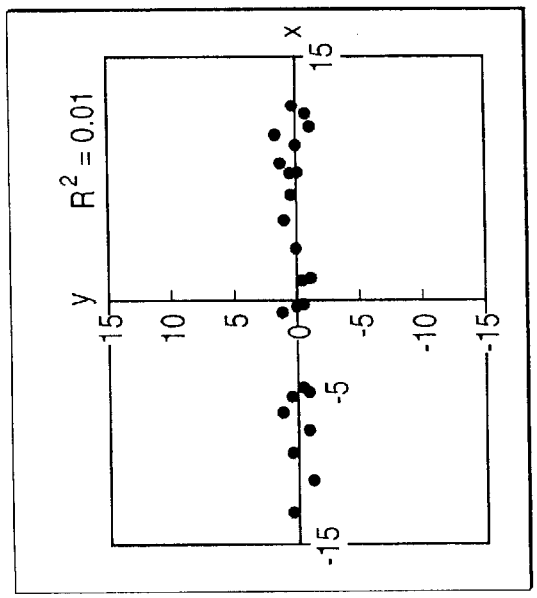

The correlation coefficient is a known coefficient disclosed in reference books about statistics, the correlation coefficient indicating the strength of the correlation between two variables. That is, if the correlation is strong, the correlation coefficient approximates 1 and −1. If the two variables have no correlation, the correlation coefficient takes zero. Namely, the process for obtaining the correlation coefficient by calculating the correlation is identical to evaluating the linearity. When the linearity is evaluated by using the correlation coefficient, there, however, arises a problem shown in FIG. 2A. That is, when the straight line parallels the X-axis as illustrated, the correlation coefficient approximates zero even if data is in the form of a straight line. Thus, the linearity cannot be evaluated. The foregoing problems can be overcome by rotating the coordinates of data to convert the X-Y coordinates into the U-V coordinates, followed by calculating the correlation by using the U-V coordinates, as shown in FIG. 2B. That is, the correlation coefficient is substantially zero in the case shown in FIG. 2A. On the other hand, the correlation coefficient is about one in the case shown in FIG. 2B. Note that FIG. 2 shows an equation for converting the x-y coordinates into the u-v coordinates and an equation for calculating the correlation coefficient in the u-v coordinate system. The square of R shown in the drawing is the correlation coefficient.

The process for evaluating opening/closing of the eyes by using the characteristics of the correlation coefficient will now be described.

FIG. 3A shows binarized images of the eye realized when the eye is opened and closed. As shown in FIG. 3A, the image of the eye usually parallels the X-axis. Moreover, the linearity of the image is enhanced when the eyes are closed. Since the correlation coefficient of a straight line paralleling the X-axis takes a value which approximates zero if the linearity is strong, no difference occurs between the state in which the eyes are opened and the state in which the eyes are closed. The image of the eyes are rotated by a predetermined angle by using the coordinate rotating means 10. Then, the correlation coefficient of the rotated image is calculated by the correlation calculating means 11. Thus, the correlation coefficient is lowered when the eyes are opened. On the other hand, the correlation coefficient is raised when the eyes are closed. The optimum predetermined angle is 45 degrees.

FIG. 4 shows an example of detection of nictation. FIG. 4 shows change in the value of the correlation coefficient corresponding to the degree of opening of the eye and appropriate thresholds for determining opening/closing. As shown in FIG. 4, when the value is larger than the threshold for determining opening/closing, the opening/closing determining means 12 determines that the eye has been closed. Thus, the nictation can be detected. Moreover, time for which the value is larger than the threshold is measured so that duration in which the eye has been closed is detected. The foregoing threshold for determining opening/closing of the eye is set to be adaptable to the characteristic of the person in accordance with an average correlation coefficient, a value obtained by filtering the correlation coefficient and a value obtained at a predetermined time before time of interest.

Although the correlation coefficient has been employed, the square of the correlation coefficient may be employed.

Second Embodiment

Figure 5:
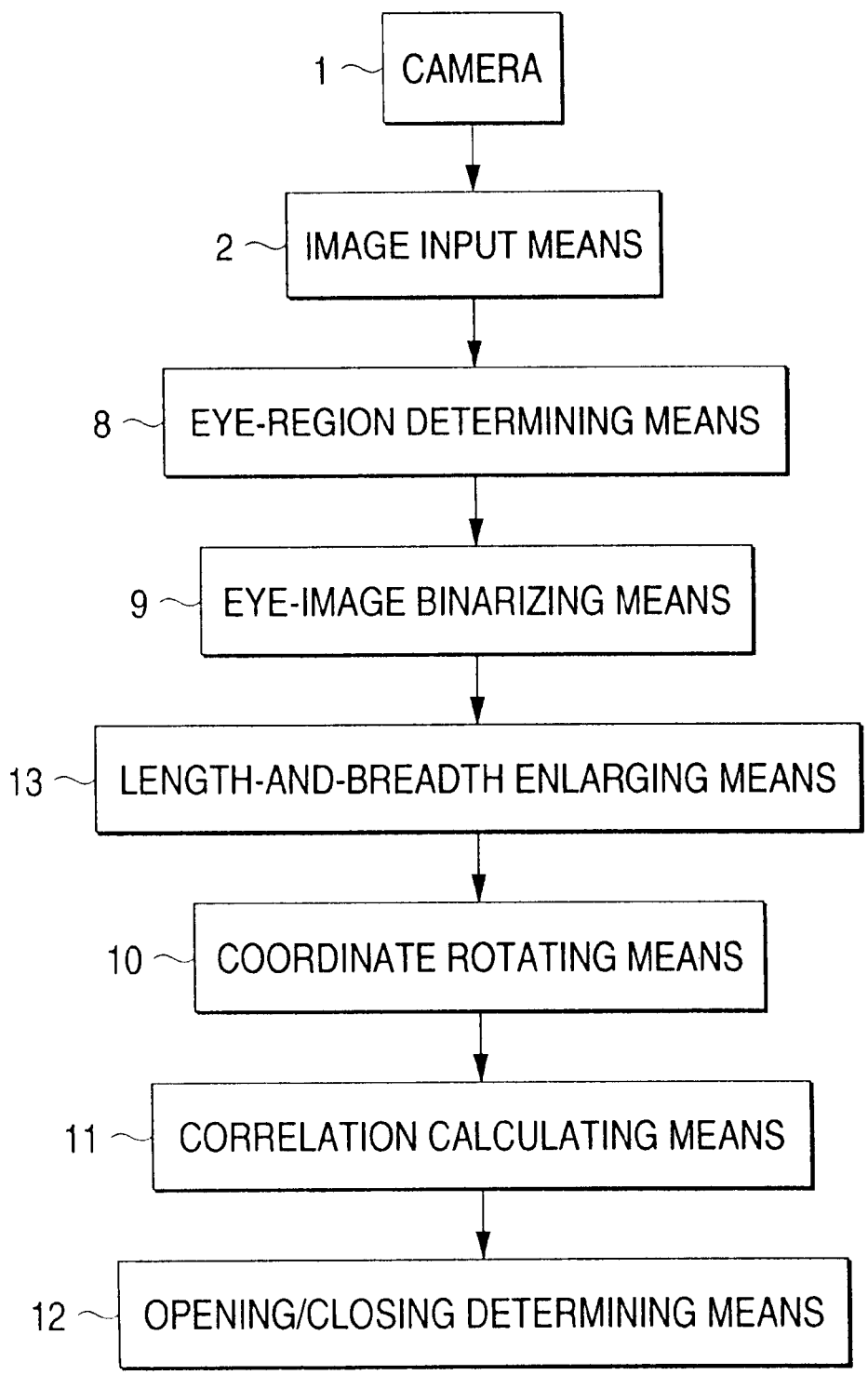
FIG. 5 is a schematic view showing the structure of a face-image processing apparatus according to a second embodiment of the present invention.

FIG. 5 is a schematic view showing the structure of a face-image processing apparatus according to a second embodiment of the present invention.

Referring to FIG. 5, reference numerals 1, 2 and 8 to 12 represent the same elements. Reference numeral 13 represents a length-and-breadth enlarging means 13 for enlarging the length and breadth of the image of the eye binarized by the eye-image binarizing means 9.

Figure 6:
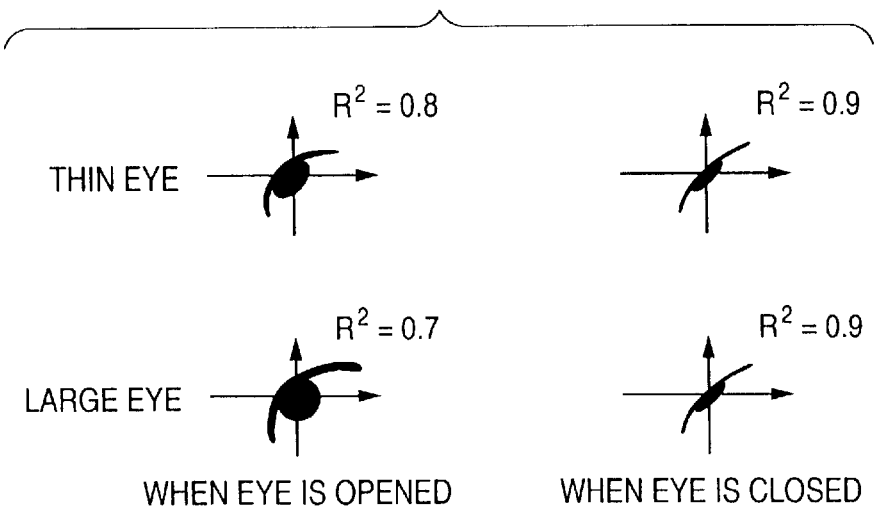
FIG. 6 is a diagram showing a comparison between a thin eye and a large eye which is performed by the face-image processing apparatus according to the second embodiment of the present invention.

FIG. 6 is a diagram showing a thin eye and a large eye which are processed by the face-image processing apparatus according to the second embodiment of the present invention.

Figure 7:
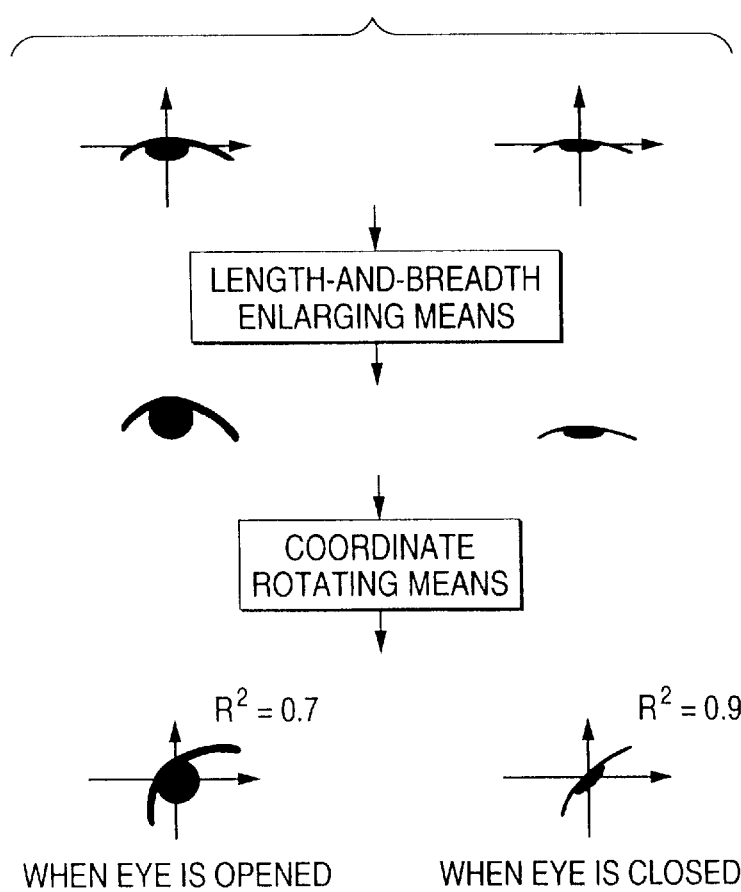
FIG. 7 is a schematic view showing a method adapted to the face-image processing apparatus according to the second embodiment of the present invention and arranged to detect opening/closing of a person having thin eyes.

FIG. 7 is a schematic view showing a method of detecting opening/closing of a thin eye which is adapted to the face-image processing apparatus according to the second embodiment of the present invention.

The operation will now be described.

FIG. 6 shows an example of a photographed person having thin eyes and an example of a photographed person having large eyes. As shown in FIG. 6, the correlation coefficient in the case of the thin eyes more approximates one as compared with the example of the photographed person having the large eyes because the shape of each eye is close to a straight line. Therefore, change between the state in which the eyes are opened and the state in which the eyes are closed is reduced. Thus, nictation cannot easily be detected. However, the coordinates of the image of the eye are input to the length-and-breadth enlarging means 13 before the same is input to the coordinate rotating means 10, followed by multiplying the value of the X and Y coordinates of each pixel of the image of the eye with a predetermined number, as shown in FIG. 7. Thus, the length and breadth of the eye is enlarged. After the enlargement has been performed, the image is input to the coordinate rotating means 10 so that the coordinates are rotated. Then, the image is input to the correlation calculating means 11 so that a correlation coefficient is calculated. The reduction ratio of the correlation coefficient in the state where the eyes are opened is higher than the reduction ratio of the correlation coefficient in the state where the eyes are closed as shown in FIG. 7. Therefore, the variation of the correlation coefficient is enlarged between the state in which the eyes are opened and the state in which the eyes are closed. As a result, performance for detecting nictation of a photographed person having thin eyes can be improved. As for the predetermined number with which the multiplication is performed, an optimum value is selected in accordance with the resolution of the image and the size of the photographed eyes.

Third Embodiment

Figure 8:
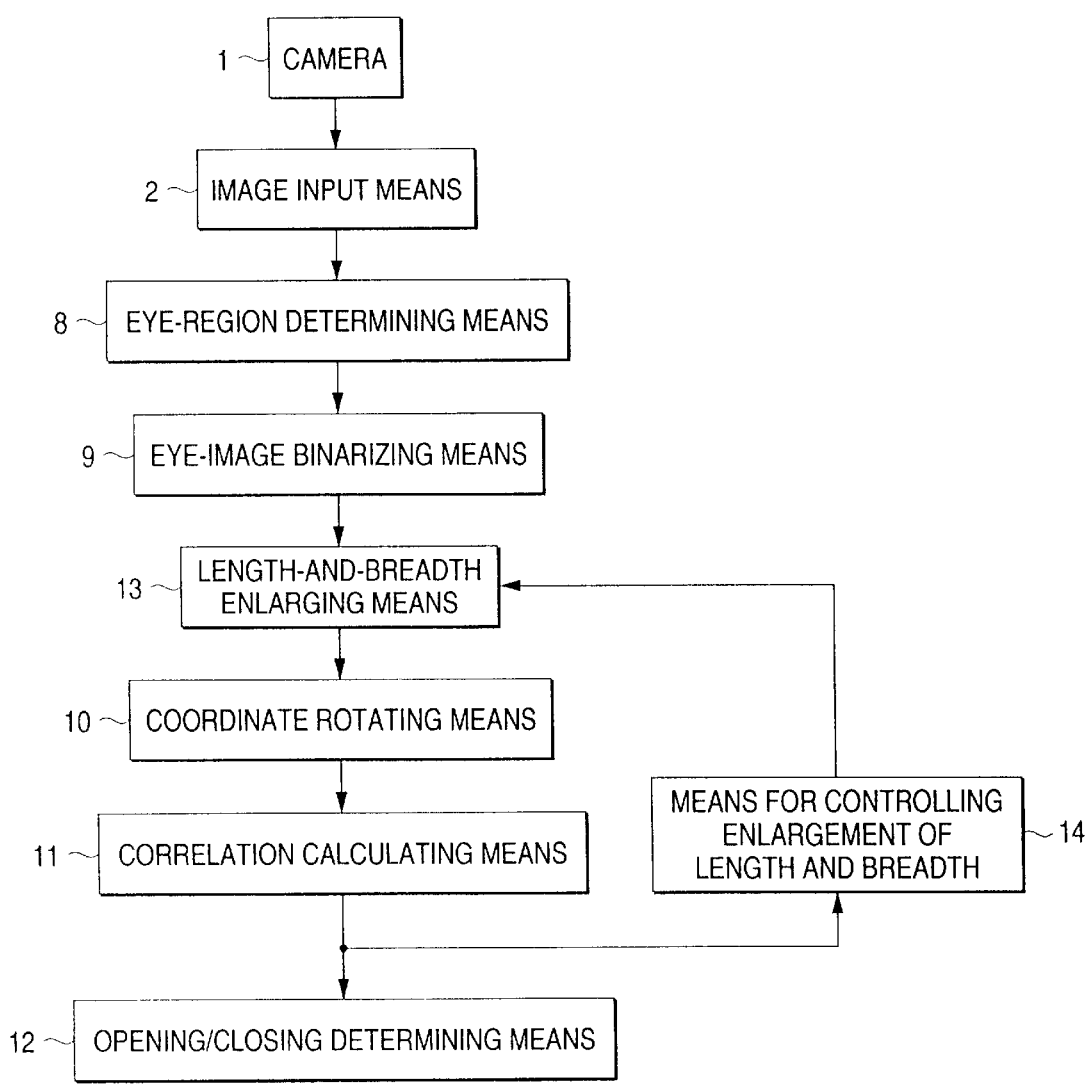
FIG. 8 is a schematic view showing a face-image processing apparatus according to a third embodiment of the present invention.

FIG. 8 is a schematic view showing the structure of a face-image processing apparatus according to a third embodiment of the present invention.

Referring to FIG. 8, reference numerals 1, 2 and 8 to 13 represent the same elements as those shown in FIG. 5. Reference numeral 14 represents a means for controlling enlargement of the length and breadth such that the value of the predetermined number of multiplication for the enlargement which is performed by the length-and-breadth enlarging means 13 is controlled so that the mean correlation coefficient obtained from the correlation calculating means 11 satisfies a predetermined range.

Figure 9:
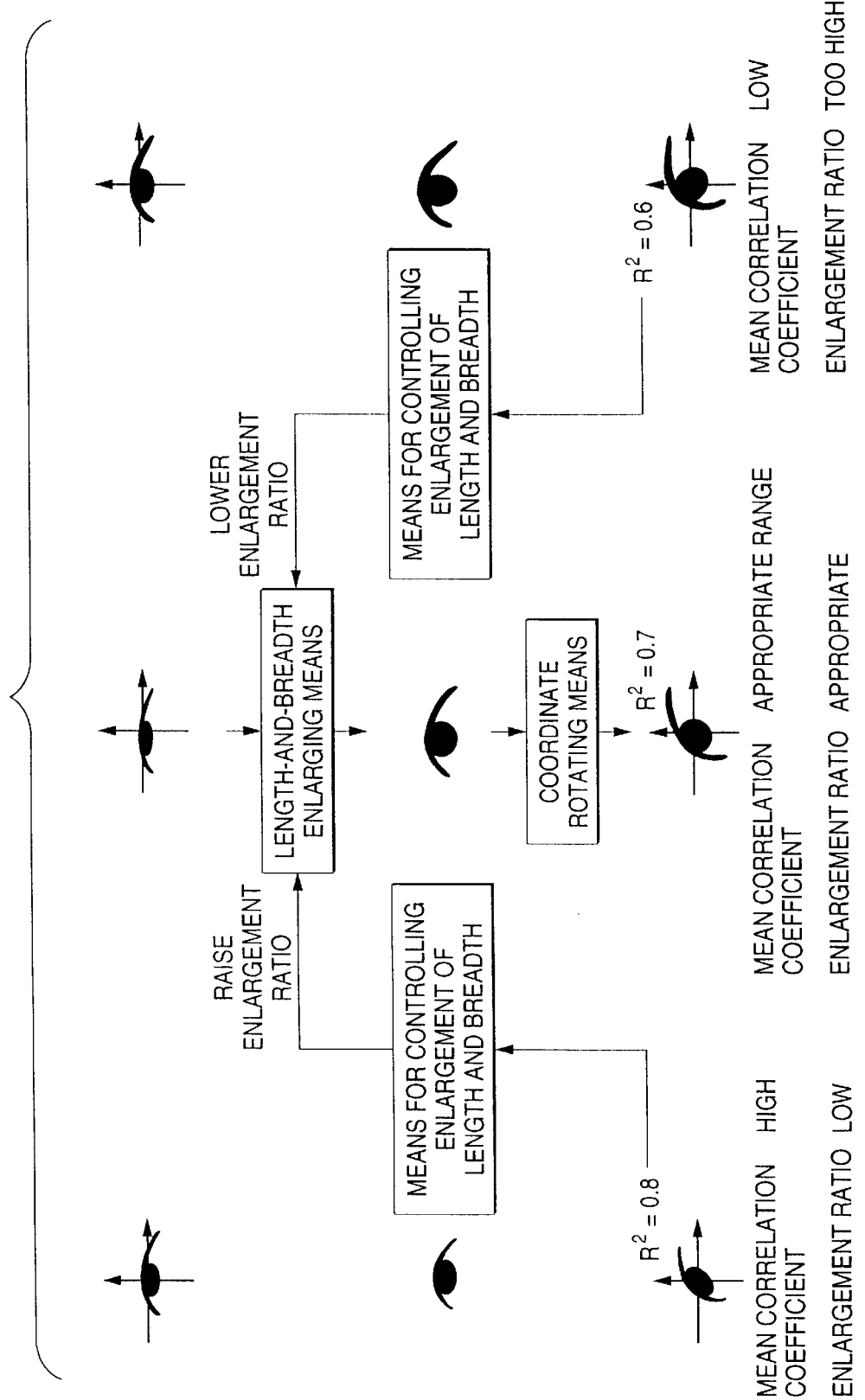
FIG. 9 is a diagram showing a method adapted to the face-image processing apparatus according to the third embodiment of the present invention and arranged to detect nictation regardless of a fact the eyes are thin or large.

FIG. 9 is a diagram showing a method of detecting nictation adapted to the face-image processing apparatus according to the third embodiment of the present invention regardless of a fact whether the eyes are thin or large.

The detection of nictation of the photographed person having the thin eyes cannot easily be detected by the structure according to the first embodiment. However, the second embodiment is able to overcome the foregoing problem. Although the first embodiment enables an excellent detection characteristic to be realized when the photographed person has large eyes, the second embodiment encounters a great reduction ratio of the correlation coefficient when the length and breadth are enlarged. As a result, detection cannot easily be performed.

Both of the first and second embodiments encounter change in the amplitude of the correlation coefficient as time elapses when nictation occurs, the change depending on the size of each eye. Thus, individual variation of the characteristic for detecting nictation occurs.

As shown in FIG. 9, the third embodiment is arranged to operate the means 14 for controlling enlargement of the length and breadth such that a mean value of the correlation coefficient obtained from the correlation calculating means 11 or a mean value of the correlation coefficient in a state in which a determination has been made that the eyes are opened satisfies a predetermined range. Thus, the predetermined value of the multiplication which is performed by the length-and-breadth enlarging means 13 is feedback-controlled.

As a result of the foregoing control, change in the correlation coefficient can be made constant regardless of the fact that the eyes are thin or large. Hence it follows that the determination of the threshold for determining opening/closing which is performed by the opening/closing determining means 12 can simply be performed. Hence it follows that individual variations in detecting nictation can be prevented.

Fourth Embodiment

Figure 10:
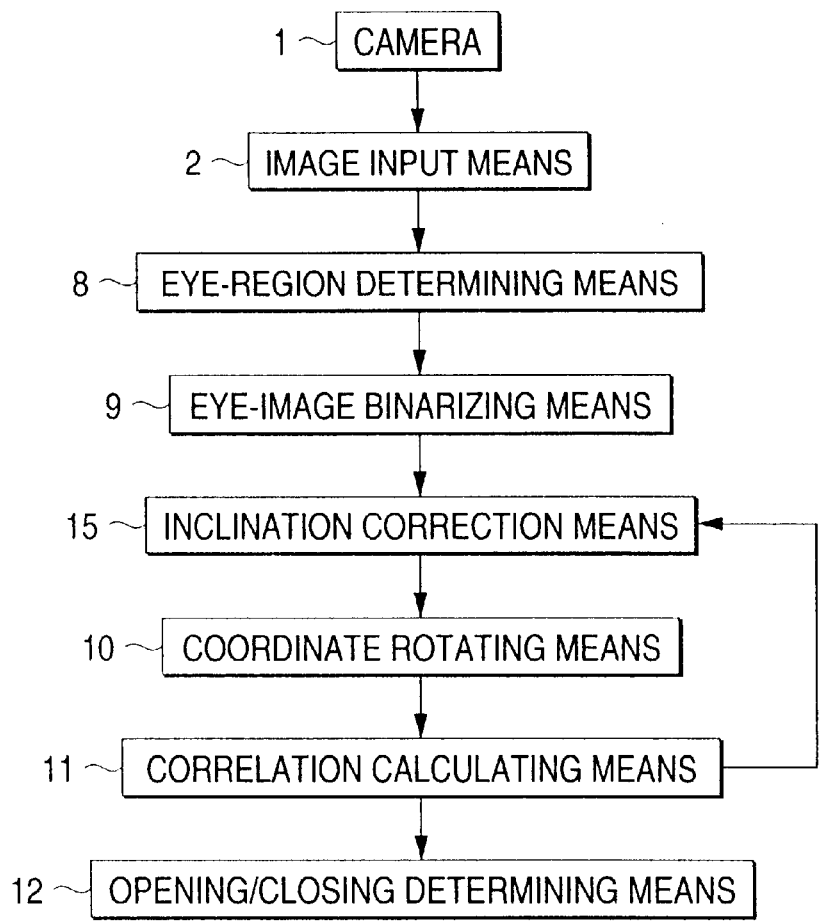
FIG. 10 is a schematic view showing a face-image processing apparatus according to a fourth embodiment of the present invention.

FIG. 10 is a schematic view showing the structure of a face-image processing apparatus according to a fourth embodiment of the present invention.

Referring to FIG. 10, reference numerals 1, 2 and 8 to 12 represent the same elements as those shown in FIG. 1. Reference numeral 15 represents an inclination correction means disposed between the eye-image binarizing means 9 and the coordinate rotating means 10. The correlation calculating means 11 inputs inclination when the primary correlation has been calculated is input to the inclination correction means 15.

Figure 11A:
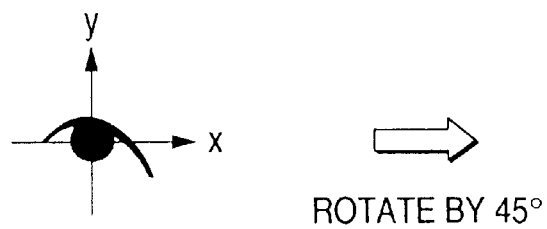
FIGS. 11A and 11B are diagrams showing a problem experienced with the face-image processing apparatus according to the fourth embodiment of the present invention when the face has been inclined.
Figure 11B:
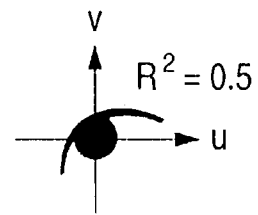

FIGS. 11A and 11B are diagrams showing problems experienced with the face-image processing apparatus according to the fourth embodiment of the present invention when the face has been inclined. FIG. 11A shows an image of the eye when the face has been inclined. FIG. 11B shows an image of the eye when the coordinates of FIG. 11A have been rotated.

FIG. 11A shows an image of the eye obtained from the eye-image binarizing means 9 when the face has been inclined. The coordinate rotating means 10 rotates the coordinates by 45 degrees as described in the first embodiment. Therefore, the image of the eye rotated by the coordinate rotating means 10 by 45 degrees is made to be as shown in FIG. 11B. Thus, a fact can easily be understood that the image approximates a straight line paralleling the X axis or the Y axis. Therefore, the characteristics of the correlation coefficient described in the first embodiment cause the value to be changed depending on the angle of inclination if the shape of the eye is the same. Hence it follows that the correlation coefficient obtained when the eye has been closed is not enlarged. As a result, nictation can not be detected.

Figure 12A:
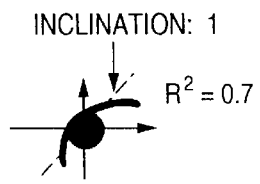
FIGS. 12A to 12C are schematic views showing the operation of the face-image processing apparatus according to the fourth embodiment of the present invention.
Figure 12B:
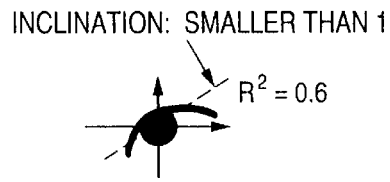
Figure 12C:
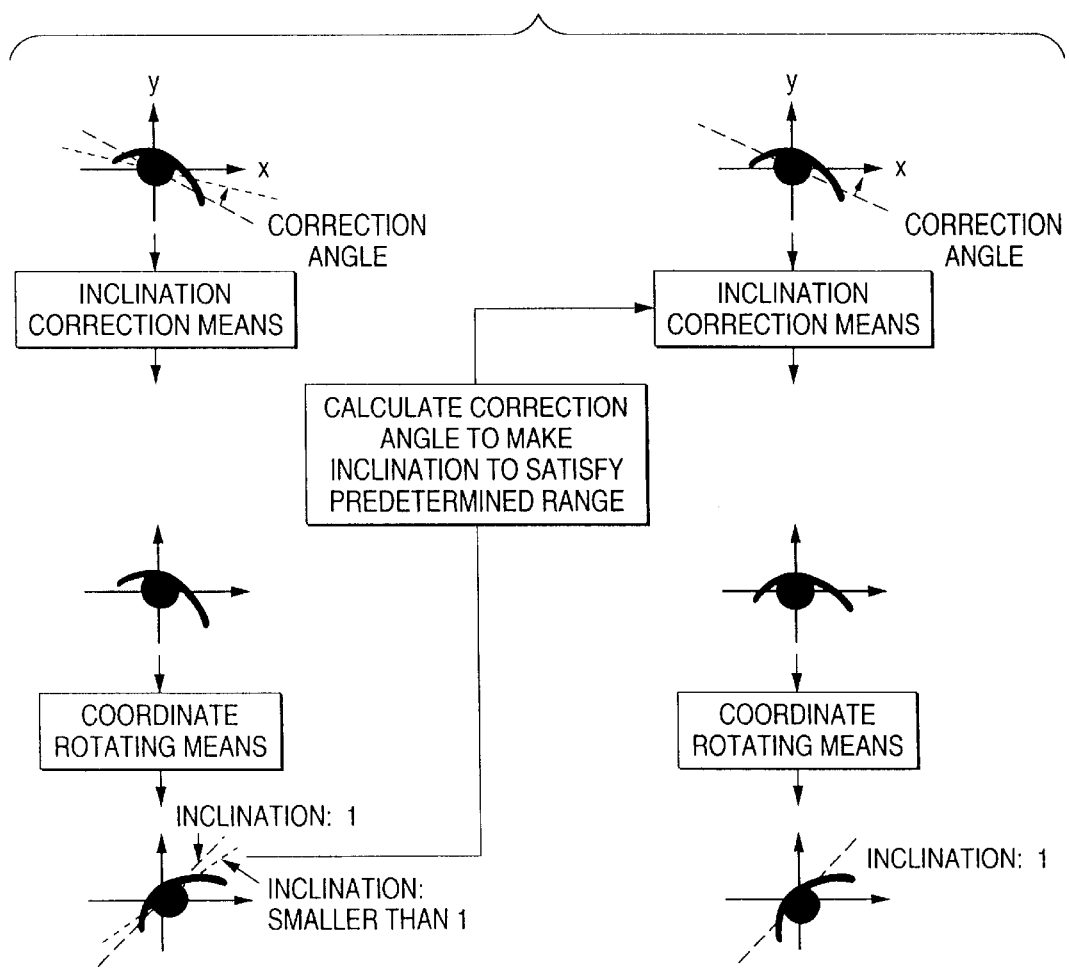

FIGS. 12A to 12C are conceptual views showing the operation of the face-image processing apparatus according to the fourth embodiment of the present invention. FIG. 12A shows an image of the eye having an inclination close to 1. FIG. 12B shows an image of the eye having an inclination which is deviated from 1. FIG. 12C shows an image of the eye which has been corrected by the inclination correction means.

The operation will now be described.

When an inclination has been taken from the correlation calculating means 11 together with the correlation coefficient, the inclination is evaluated. Thus, whether or not the angle of rotation performed by the coordinate rotating means 10 is an adequate angle can be determined. When the inclination closes to 1 as shown in FIG. 12A, the image of the eye has been rotated by an ideal angle of rotation. Therefore, satisfactory change in the correlation coefficient owning to nictation can be expected. As the inclination deviates from 1 as shown in FIG. 12B, the angle of rotation performed by the coordinate rotating means 10 becomes inadequate. The inclination correction means 15 uses the foregoing characteristics. The inclination obtained from the correlation calculating means 11 is input to the inclination correction means 15. Thus, the inclination correction means 15 feedback-controls the angle of rotation which is performed by the coordinate rotating means 10 such that the inclination does not deviate from a range in which a determination of nictation can satisfactorily be performed.

The foregoing means enables the inclination of the image of the eye rotated by the coordinate rotating means 10 to satisfy a predetermined range as shown in FIG. 12C if the face has been inclined. Therefore, the correlation calculating means 11 is able to output a correlation coefficient corresponding to the degree of opening/closing of the eye regardless of the inclination of the face. As a result, the opening/closing determining means 12 is able to satisfactorily detect nictation.

Fifth Embodiment

Figure 13:
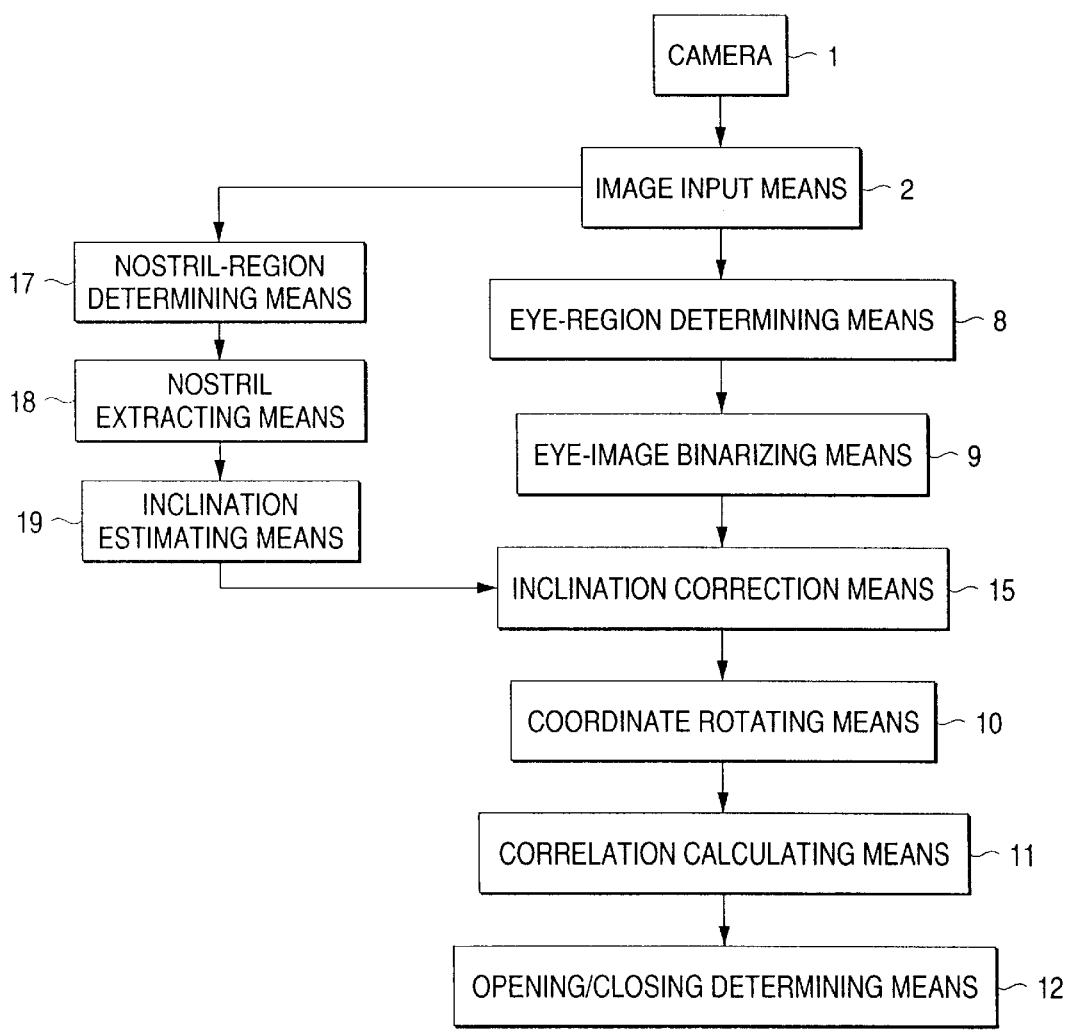
FIG. 13 is a schematic view showing the structure of a face-image processing apparatus according to a fifth embodiment of the present invention.

FIG. 13 is a schematic view showing the structure of a face-image processing apparatus according to a fifth embodiment of the present invention.

Referring to FIG. 13, reference numerals 1, 2, 8 to 12 and represent the same elements as those shown in FIG. 10. Reference numeral 17 represents a nostril-region determining means, 18 represents a nostril extracting means and 19 represents an inclination estimating means.

Figure 14:
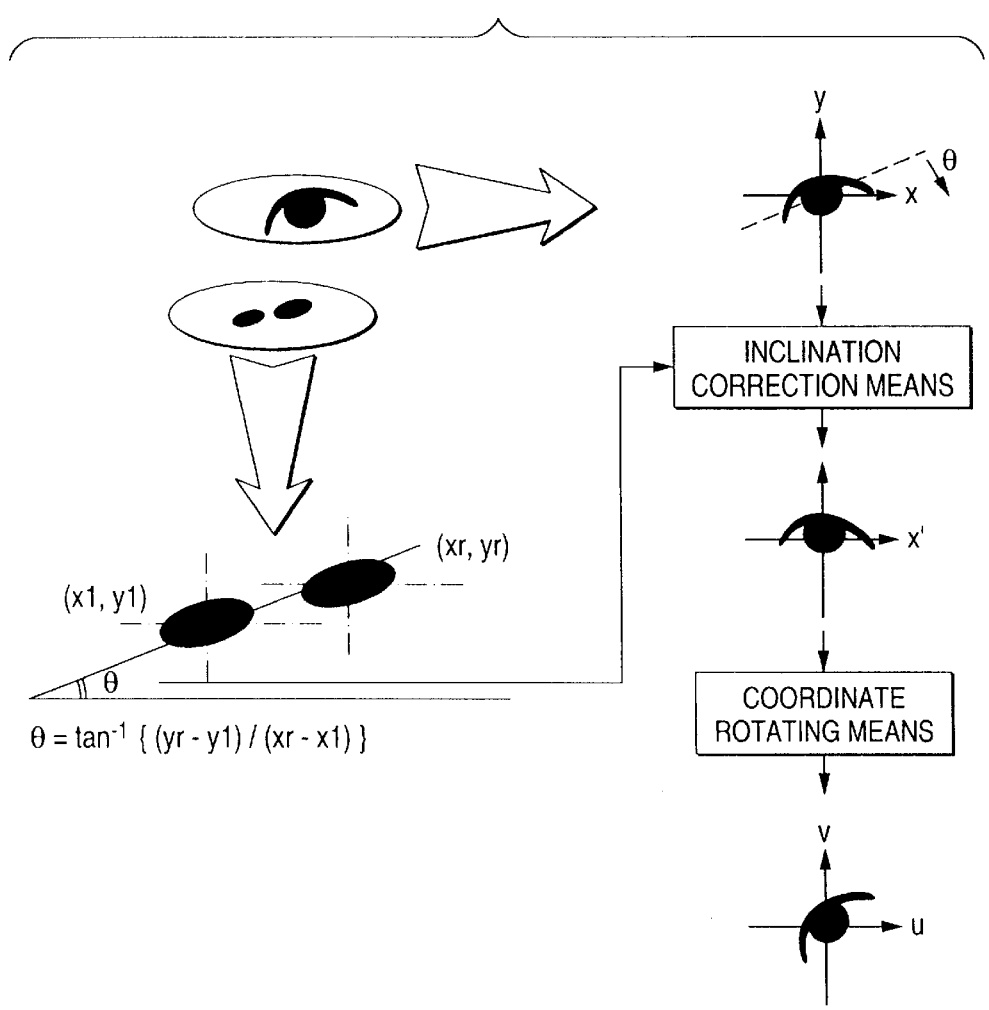
FIG. 14 is a conceptual view showing the operation of the face-image processing apparatus according to the fifth embodiment of the present invention.

FIG. 14 is a conceptual view showing the operation of the face-image processing apparatus according to the fifth embodiment of the present invention.

The face-image processing apparatus according to the fifth embodiment incorporates the means for extracting two nostrils in addition to the structure according to the fourth embodiment. That is, the nostril-region determining means 17 specifies the nostril region included in the image of the face supplied from the image input means 2. Then, the image of the two nostrils in the specified nostril region can be obtained by the nostril extracting means 18. Then, the image of the two nostrils is supplied to the inclination estimating means 19. The inclination estimating means 19 obtains the coordinates of the center of gravity of each of the two nostrils, as shown in FIG. 14. Then, the two coordinates are used to calculate the inclination of the face in accordance with an equation shown in FIG. 14. Assuming that the inclination estimated by the inclination estimating means 19 is θ, the angle of rotation which will be instructed to the coordinate rotating means 10 is calculated by a formula 45 degrees−θ.

If the face is inclined, the foregoing means are able to remove an influence of the inclination of the face which is exerted on the inclination of the image of the eye rotated by the coordinate rotating means 10 as shown in FIG. 14. Therefore, the correlation calculating means 11 is able to output a correlation coefficient corresponding to the degree of opening/closing of the eye regardless of the inclination of the face. Hence it follows that the opening/closing determining means 12 is able to satisfactorily detect nictation.

Sixth Embodiment

Figure 15:
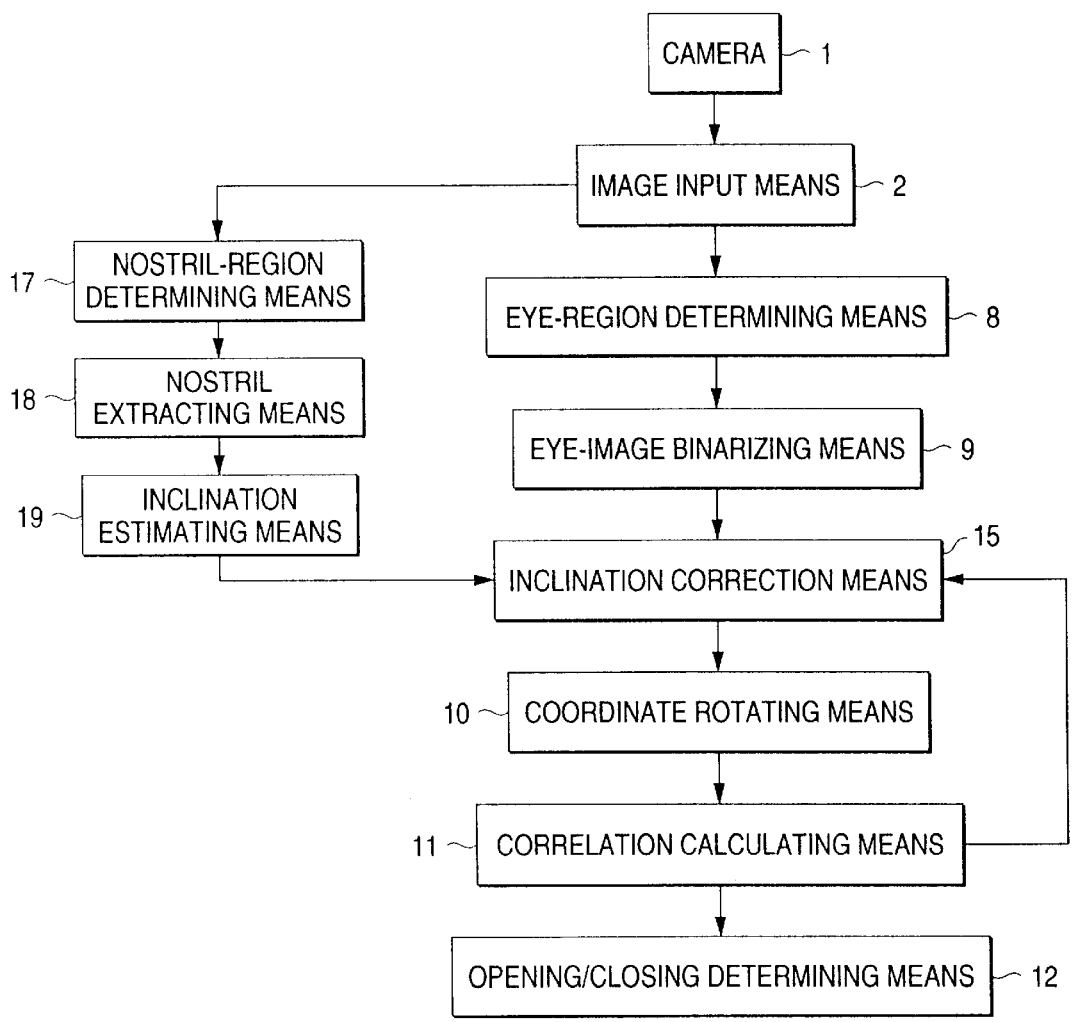
FIG. 15 is a schematic view showing a face-image processing apparatus according to a sixth embodiment of the present invention.

FIG. 15 is a schematic view showing the structure of a face-image processing apparatus according to a sixth embodiment of the present invention.

Referring to FIG. 15, reference numerals 1, 2, 8 to 12, 15 and 17 to 19 represent the same elements as those shown in FIG. 13.

Figure 16A:
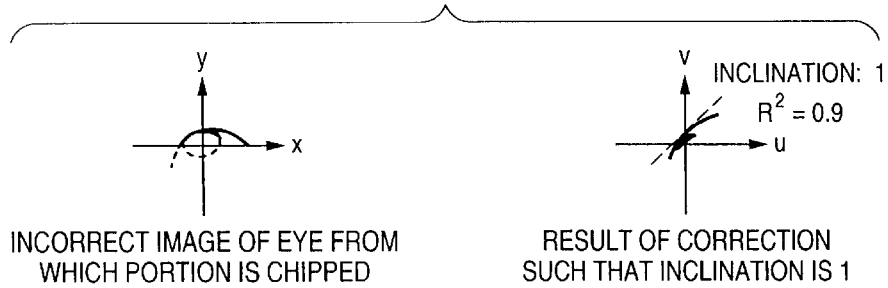
FIGS. 16A and 16B are diagrams showing a problem experienced with the face-image processing apparatus according to the sixth embodiment of the present invention when a portion of the image of the eye is chipped and the operation of the apparatus.
Figure 16B:
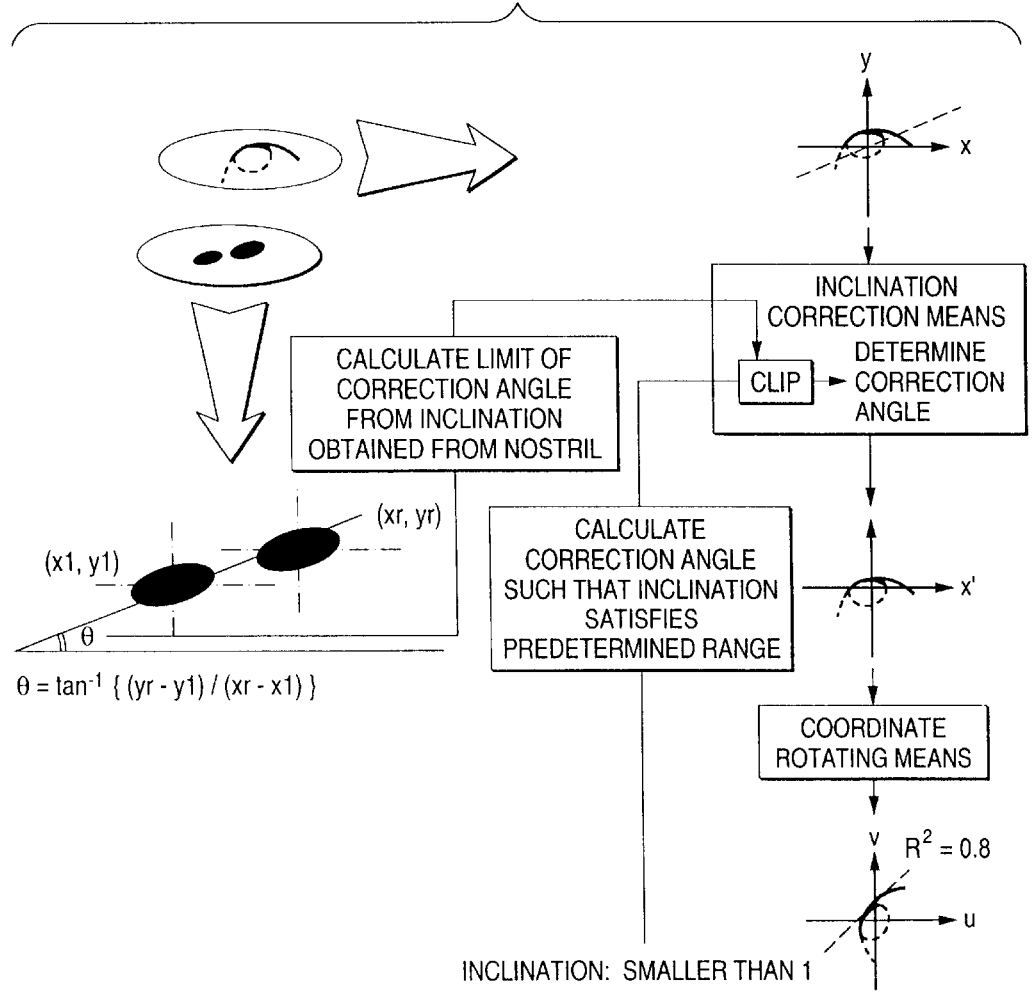

FIGS. 16A and 16B are diagrams showing a problem which is experienced with the face-image processing apparatus according to the sixth embodiment of the present invention when a portion of an image of the eye become chipped and the operation. FIG. 16A is a diagram showing an inadequate angle of correction. FIG. 16B is a diagram showing a state in which the angle of correction is limited.

The operation will now be described.

The basic structure of the sixth embodiment is similar to that according to the fourth embodiment. Moreover, an inclination estimating means 19 is added which estimates the inclination of the face in accordance with the nostrils described in the fifth embodiment. Note that the inclination of the face estimated by the inclination estimating means 19 is not used to give an angle of correction which is performed by the inclination correction means 15 as is used in the fifth embodiment. Similarly to the fourth embodiment, the estimated inclination of the face is used as a clipped value for the angle of correction which can be obtained when feedback control is performed so that the correlation coefficient obtained from the correlation calculating means 11 satisfies a predetermined range. That is, in the fourth embodiment, the inclination correction means 15 is operated such that an optimum angle of correction for calculating the correlation coefficient can be obtained. If an image of the eye obtained from the eye-image binarizing means 9 is an inadequate image owning to a chipped image of the eye as shown in FIG. 16A, then correction of the inclination performed by the inclination correction means 15 becomes incorrect. Therefore, the angle of correction performed by the inclination correction means 15 is limited by using the inclination estimated by the inclination estimating means 19 which uses detected nostrils. Thus, incorrect correction of the inclination is limited, as shown in FIG. 16B. If the angle of correction is controlled as shown in FIG. 16A, the correlation coefficient is enlarged. When the angle of correction is limited as shown in FIG. 16B, the influence can be eliminated. As a result, generation of an incorrect value for evaluating opening/closing can be prevented. Hence it follows that accuracy of the detection of nictation performed by the opening/closing determining means 12 can be improved.

Seventh Embodiment

Figure 17:
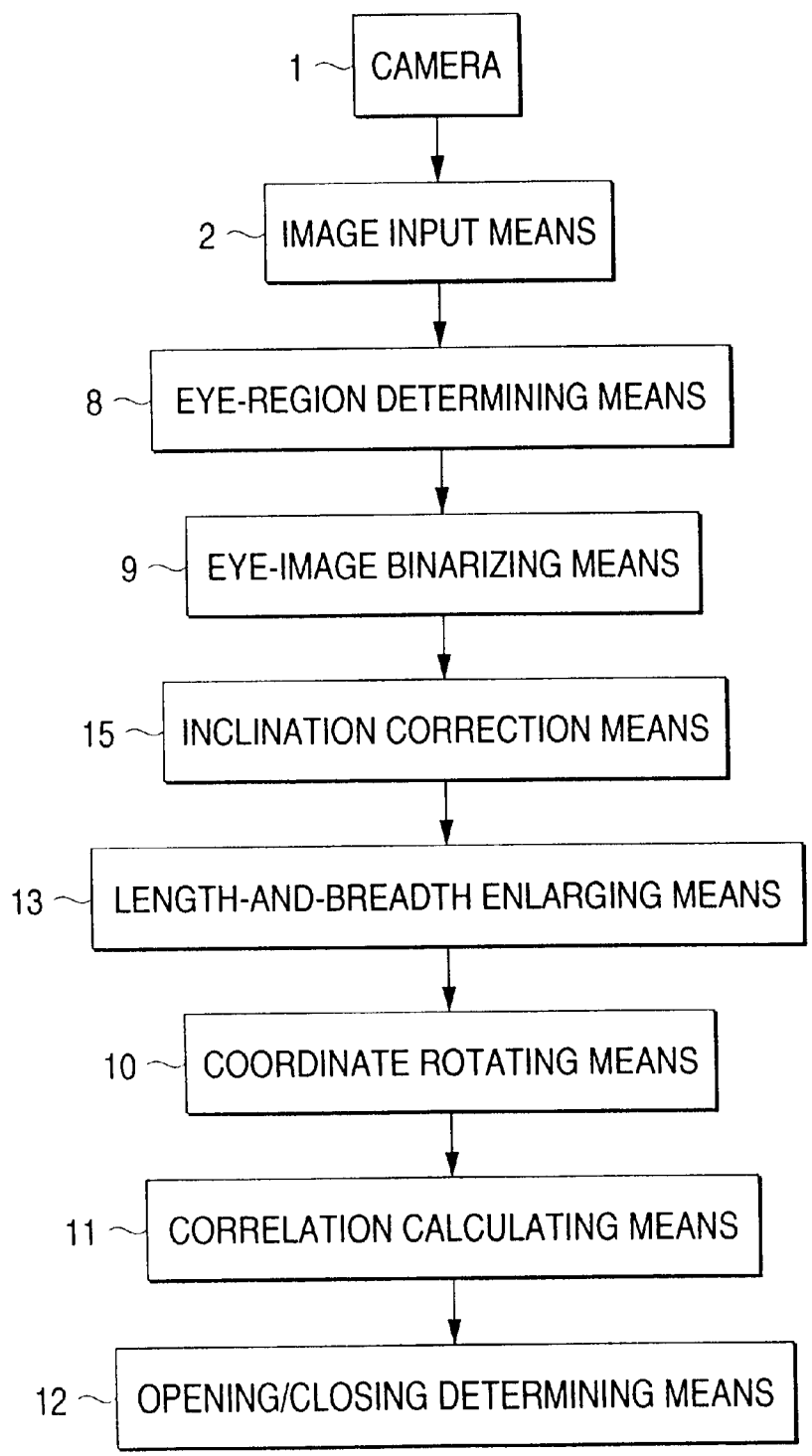
FIG. 17 is a schematic view showing the structure of a face-image processing apparatus according to a seventh embodiment of the present invention.

FIG. 17 is a schematic view showing a face-image processing apparatus according to a seventh embodiment of the present invention.

Referring to FIG. 17, reference numeral 1, 2 and 8 to 13 represent the same elements at those shown in FIG. 5. Reference numeral 15 represents the same element as those shown in FIG. 10.

Figure 18A:
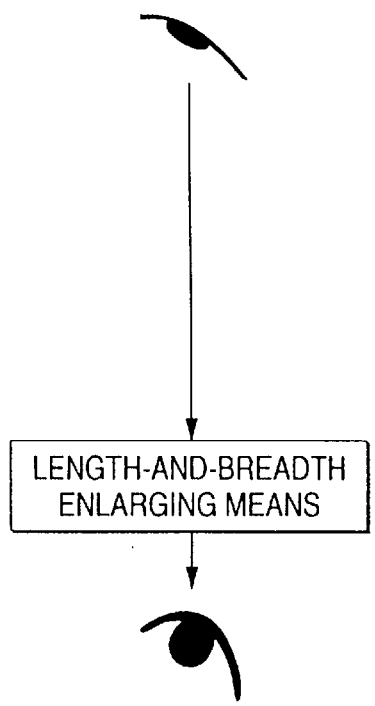
FIGS. 18A and 18B are diagrams showing the operation of the face-image processing apparatus according to the seventh embodiment of the present invention.
Figure 18B:
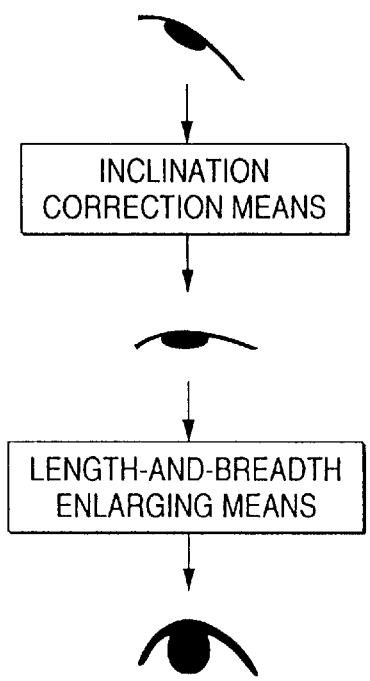
Figure 19:
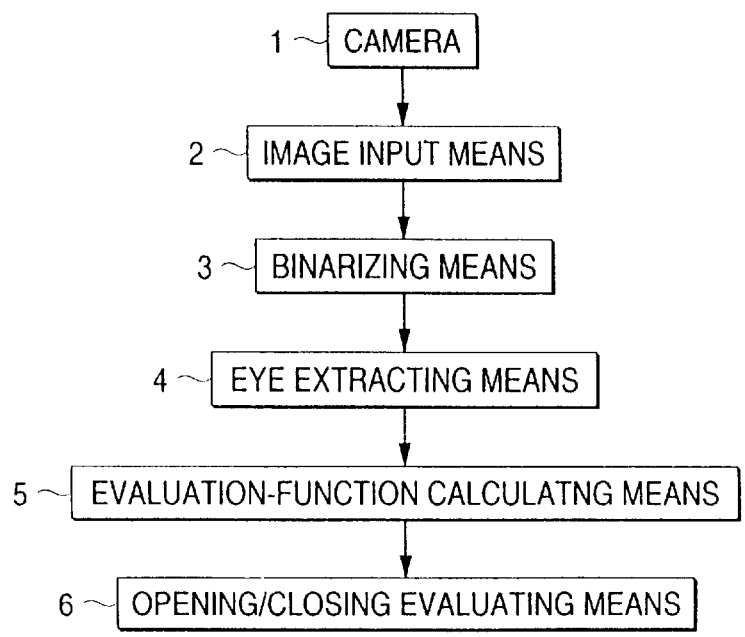
FIG. 19 is a schematic structural view showing conventional detection of a state of a driver.
Figure 20:
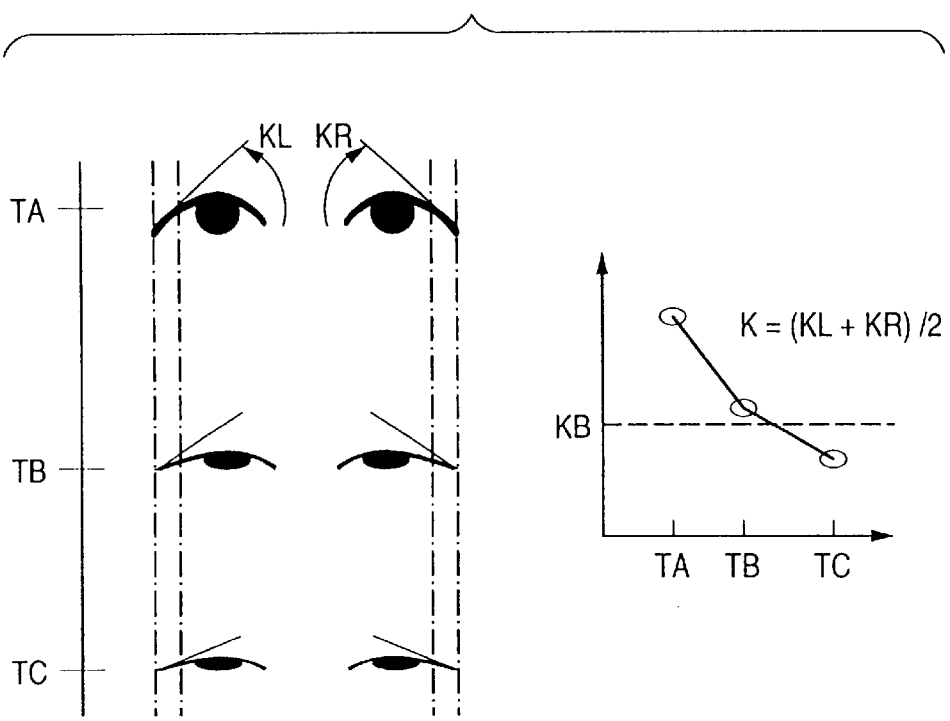
FIG. 20 is a diagram showing the operation of conventional detection of a state of a driver.

FIGS. 18A and 18B are diagrams showing the operation of the face-image processing apparatus according to the seventh embodiment of the present invention. FIG. 18A shows a state in which the length-and-breadth enlarging means has enlarged the length and breadth of an output of an image of an inclined face from the eye-image binarizing means. FIG. 18B is a diagram showing a state realized by the inclination correction means.

The seventh embodiment has a structure that the inclination correction means 15 similar to that according to each of the fourth, fifth and sixth embodiments is inserted between the eye-image binarizing means 9 and the length-and-breadth enlarging means 13.

The operation will now be described.

FIG. 18A shows an output from the eye-image binarizing means 9 when the face has been inclined. When the image of the eye is enlarged in the direction of the Y-axis, the eye is actually enlarged in a diagonal direction. That is, the length of the image of the eye is simultaneously enlarged. Therefore, the correlation coefficient is reduced as compared with enlargement in only the direction of the breadth. As a result of the foregoing influence, the effect of enlargement described in the second and third embodiments cannot be obtained. Hence it follows that opening/closing cannot be detected. Therefore, the inclination of the face is estimated as described in the fourth, fifth and sixth embodiments, and then the inclination correction means 15 corrects the image of the eye to the horizontal position. Then, the length-and-breadth enlarging means 13 is operated to perform the process similar to that according to the second and third embodiment. As a result, satisfactory performance for detecting nictation can be obtained regardless of the inclination of the face and the size of the eye.

Since the present invention is structured as described above, the-following effects can be obtained.

The apparatus comprises: image input means to which an image of the face photographed by a camera is input; an eye-image extracting means for extracting a binarized image of the eye from the image of the face input by the image input means; coordinate rotating means for rotating the coordinates of the image of the eye extracted by the eye-image extracting means for a predetermined angle; correlation calculating means for calculating primary correlation by using the image of the eye rotated by the coordinate rotating means; and opening/closing determining means for determining opening/closing of the eye in accordance with a correlation coefficient obtained owning to the calculation performed by the correlation calculating means. Therefore, if the state of binarization of the image of the eye is changed, opening/closing of the eyes can stably be determined.

The eye-image extracting means incorporates an eye-region determining means for specifying the eye region of the image of the face input by the image input means and binarizing means for binarizing the image of the eye contained in the eye region. Therefore, the image of the eye can be binarized from the specified eye region.

Since the length-and-breadth enlarging means for enlarging the length and breadth of the image of the eye binarized by the eye-image extracting means is provided, even for the photographed person having thin eyes, opening/closing of the eyes can satisfactorily be determined.

Since means for controlling enlargement of the length and breadth of the image of the eye which is performed by the length-and-breadth enlarging means so that the correlation coefficient satisfies a predetermined range, individual variation of the size of the eyes can be absorbed.

Moreover, there is provided the inclination correction means for correcting the inclination of the image of the eye binarized by the eye-image extracting means. In addition, the coordinate rotating means rotates the image of the eye corrected by the inclination correction means. Therefore, an image of the eye free from inclination can be rotated.

The inclination correction means performs correction so that the correlation coefficient satisfies a predetermined range. Therefore, if the inclination of the face of the photographed person is changed, opening/closing of the eyes can satisfactorily be determined.

The inclination estimating means is provided which estimates the inclination of the image of the face from the image of the face input by the image input means. Moreover, the inclination correction means uses the inclination of the image of the face estimated by the inclination estimating means to correct the image of the eye. Therefore, the correction can adequately be performed.

The inclination estimating means for estimating the inclination of the image of the face input by the image input means is provided. Moreover, the inclination estimated by the inclination estimating means is used to limit the correction of the inclination of the image of the eye which is performed by the inclination correction means. Therefore, incorrect correction can be prevented.

Since the inclination estimating means estimates the inclination by using an image of the nostrils extracted from the image of the face, the inclination can adequately be estimated.

The extraction of the image of the nostrils is performed by nostril-region determining means for specifying a nostril region and nostril extracting means for extracting the image of nostrils from the nostril region specified by the nostril-region determining means.

What is claimed is:

1. A face-image processing apparatus comprising:
   image input means to which an image of the face photographed by a camera is input;
   eye-image extracting means for extracting a binarized image of an eye from the image of the face input by said image input means;
   coordinate rotating means for rotating coordinates of the image of the eye extracted by said eye-image extracting means for a predetermined angle;
   correlation calculating means for calculating correlation by using the image of the eye rotated by said coordinate rotating means; and
   opening/closing determining means for determining opening/closing of the eye in accordance with a correlation coefficient obtained by the calculation performed by said correlation calculating means.

2. The face-image processing apparatus according to claim 1, wherein said eye-image extracting means comprises:
   eye-region determining means for specifying an eye region of the image of the face input by said image input means, and
   binarizing means for binarizing the image of the eye contained in the eye region.

3. The face-image processing apparatus according to claim 1, further comprising:
   length-and-breadth enlarging means for enlarging the length and breadth of the image of the eye binarized by said eye-image extracting means.

4. The face-image processing apparatus according to claim 3, further comprising:
   means for controlling enlargement of the length and breadth of the image of the eye which is performed by said length-and-breadth enlarging means so that a mean value of the correlation coefficient satisfies a predetermined range.

5. The face-image processing apparatus according to claim 1, further comprising:
   inclination correction means for correcting an inclination of the image of the eye binarized by said eye-image extracting means, wherein
   said coordinate rotating means rotates the image of the eye corrected by said inclination correction means.

6. The face-image processing apparatus according to claim 5, wherein
   said inclination correction means performs correction so that the correlation coefficient satisfies a predetermined range.

7. The face-image processing apparatus according to claim 5, further comprising:
   inclination estimating means for estimating the inclination of the image of the face from the image of the face input by said image input means, wherein
   said inclination correction means uses the inclination of the image of the face estimated by said inclination estimating means to correct the image of the eye.

8. The face-image processing apparatus according to claim 6, further comprising:
   inclination estimating means for estimating the inclination of the image of the face input by said image input means, wherein
   the inclination estimated by said inclination estimating means is used to limit the correction of the inclination of the image of the eye which is performed by said inclination correction means.

9. The face-image processing apparatus according to claim 7, wherein
   said inclination estimating means estimates the inclination by using an image of the nostrils extracted from the image of the face.

10. The face-image processing apparatus according to claim 9, further comprising:
    nostril-region determining means for specifying a nostril region, and
    nostril extracting means for extracting the image of nostrils from the nostril region specified by said nostril-region determining means, wherein
    extraction of the image of the nostrils is performed by said nostril-region determining means and said nostril extracting means.

* * * * *